United States Patent Office 3,228,976
Patented Jan. 11, 1966

3,228,976
1,4-BIS-(AMINOMETHYL)-1-CYCLOHEXENE COMPOUNDS
Leslie G. Humber, Montreal, Quebec, Canada, assignor to American Home Products Corporation, New York, N.Y., a corporation of Delaware
No Drawing. Filed Mar. 3, 1964, Ser. No. 349,160
8 Claims. (Cl. 260—501)

This application is a continuation-in-part of my copending application, Serial No. 256,270, filed February 5, 1963.

This invention relates to new derivatives of 1-cyclohexene, and to a process for their preparation. More particularly, my invention relates to derivatives of 1,4-bis-(aminomethyl)-1-cyclohexene, which new chemical compounds possess valuable pharmacological properties.

This invention also relates to new intermediates in the preparation of said pharmacologically active compounds.

The new pharmacologically active compounds of the present invention, in base form, may be represented by the Formula I:

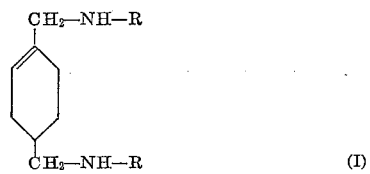

(I)

wherein R is a radical selected from the group consisting of benzyl, halo-substituted benzyl, trihalomethyl-substituted benzyl, cycloalkyl, cycloalkylalkyl and indanyl.

In base form these compounds possess interesting biological activities, and, being basic in nature, they form tertiary acid addition salts. Such acid addition salts with pharmacologically acceptable acids are biologically equivalent to the free base, and constitute a preferred form for the administration of the pharmacologically active compounds of my invention.

The new chemical compounds in base form, and their acid addition salts with pharmacologically acceptable acids, are useful as agents for lowering cholesterol levels in the blood. For example, they will lower cholesterol blood levels in the intact rat by highly significant degrees when administered orally in small doses.

As agents for lowering cholesterol levels in blood, the active compounds of this invention may be administered both orally or by injection. For oral administration, the active compounds of this invention, either as the free base or in the form of a pharmacologically acceptable salt, may be formulated in solid dosage forms such as, tablets or capsules, together with carriers such as, e.g., lactose, starch, magnesium stearate, and the like. For administration by injection, the active compounds of this invention are preferably used in the form of one of their pharmaceutically acceptable salts, dissolved in a suitable aqueous vehicle. Both oral dosage forms and dosage forms for injection may be formulated to contain from 5 to 500 mg. of the active ingredient.

The pharmacologically active compounds of this invention may be conveniently prepared from the compound of Formula II:

(II)

in which A represents CO—Cl or $CH_2$—$NH_2$. When A represents CO—Cl, the compound of Formula II is prepared from 1-cyclohexene-1,4-dicarboxylic acid [Baily and Barclay, J. Am. Chem. Soc. 81, 5395 (1959)] and thionyl chloride by conventional procedures. When A represents $CH_2$—$NH_2$, the compound of Formula II is prepared from 1-cyclohexene-1,4-dicarboxamide (obtained by conventional procedures from reaction of the corresponding diacid chloride with ammonia) by reaction with a suitable reducing agent. Preferred reducing agents include lithium aluminium hydride or hydrogen in the presence of a noble metal catalyst. A preferred solvent is tetrahydrofuran. This reduction is effected at a temperature up to the temperature of reflux of the resulting mixture. Alternatively, the biscarboxamide may be dehydrated to the corresponding bisnitrile by conventional means such as, for example, refluxing with thionyl chloride or phosphorus pentachloride. The corresponding bisnitrile may then be reduced to the corresponding bisamine by conventional reducing agents, such as, for example, lithium aluminum hydride, sodium in alcohol, or catalytic hydrogenation.

Thus, the compound of Formula II is reacted with two molar equivalents of a compound of the Formula B wherein, when A is CO—Cl, B is R—$NH_2$ with R representing a member of the group consisting of benzyl, substituted benzyl wherein the substituents may be halogen or trihalomethyl; or R may be a cycloalkyl, cycloalkylalkyl, or indanyl group. When A is $CH_2$—$NH_2$, B is $R^1$—CO—$R^2$ wherein $R^1$ is hydrogen when $R^2$ is a phenyl group or a substituted phenyl group wherein the substituents may be halogen or trihalomethyl groups; or $R^2$ represents a cycloalkyl or cycloalkylalkyl group; or $R^1$ and $R^2$ together may represent an alkylene chain; or $R^1$—CO—$R^2$ represents an indanone moiety.

The above process yields amides or Schiff bases of the Formula III:

(III)

wherein, when G is CO—NH—, L has the same significance as R above; and when G is $CH_2$—N—, L may be an indanylidine group, a benzylidine group, or a substituted benzylidine group wherein the substituents may be halogen or trihalomethyl groups, or L may represent a cycloalkylidine or cycloalkylalkylidine group. Reducing said amide or Schiff base with a reducing agent yields the corresponding disubstituted cyclohexene derivatives of Formula I which, if desired, are transformed into pharmacologically acceptable acid addition salts thereof.

More specifically, the procedure for preparing the new chemical compounds may be described as follows:

A suitable benzyl, substituted benzyl, cycloalkyl or cycloalkylalkyl aldehyde or a suitable cycloalkanone or indanone is caused to react with 1,4-bisaminomethyl-1-cyclohexene by bringing the two reactants together, at a suitable temperature, preferably and, if necessary, in the presence of an inert solvent. A preferred solvent in this reaction is benzene. A preferred temperature is the temperature of reflux of the reaction mixture. This results in condensation to form the corresponding Schiff base, with elimination of two molecules of water which are conveniently removed, preferably by azeotropic distillation.

The resulting Schiff base is then reduced to the corresponding amino compound. Convenient reducing agents include lithium aluminum hydride in an inert solvent such as ethers or cyclic ethers, sodium borohydride in alcoholic solution and catalytic hydrogenation. This reduction is preferably carried out with sodium borohydride in methanolic solution. The free base is then recovered, preferably by evaporation of the solvent. If a pharmacologically equivalent acid addition salt of the free base is desired, this may be prepared by treating the free base in the conventional manner with the acid. The acid selected will, of course, be a pharmaceutically acceptable acid, for example, a mineral acid such as one of the hydrohalic acids, or an organic acid such as, for example, acetic acid.

Alternatively, a suitable benzyl, substituted benzyl, cycloalkyl, cycloalkylalkyl or indanyl amine is caused to react with a suitable 1-cyclohexene-1,4-dicarbonyl halide at a suitable temperature and in a suitable inert solvent. A preferred solvent is benzene and a preferred temperature is that of the refluxing reaction mixture. An excess of the amine or a base such as, for example, sodium hydroxide, pyridine or the like is used as an acid acceptor to remove the hydrogen halide which is split out in the reaction. This results in condensation to form the corresponding diamide. The resulting diamide is then reduced to the corresponding diamine, the reduction being preferably carried out with lithium aluminum hydride. The resultant product may then be converted to a suitable acid addition salt, by conventional means, as described above.

Details of this process, as applied to the preparation of specific chemical compounds within the scope of my invention, are given below.

EXAMPLE 1

*1-cyclohexene-1,4-dicarbonyl chloride*

1-cyclohexene-1,4-dicarboxylic acid (63 gm.) [prepared according to Bailey and Barclay, J. Am. Chem. Soc. 81, 5395 (1959)] was suspended in benzene and heated with thionyl chloride (211 gm.) for 22 hours. Distillation yielded the title compound B.P. 140° C./0.06 mm.

EXAMPLE 2

*1-cyclohexene-1,4-dicarboxamide*

The diacid chloride of Example 1 (71 gm.) was added slowly with stirring to concentrated aqueous ammonium hydroxide (200 ml.) at 0° C. The solid amide was isolated by filtration and washed with water. A sample, crystallized from dimethylformamide had M.P.>310° C. Analysis confirmed the empirical formula $C_8H_{12}O_2N_2$.

EXAMPLE 3

*1-cyclohexene-1,4-bismethylamine*

1-cyclohexene-1,4-dicarboxamide (24.6 gm.) was reduced with lithium aluminum hydride (10.9 gm.) by refluxing in tetrahydrofuran for 24 hours. Water (50 ml.) was added carefully and the precipitated salts removed by filtration. The filtrate was dried with sodium sulphate and fractionated to yield the title compound as an oil, B.P. 76-78° C. (0.1 mm.).

EXAMPLE 4

*1-cyclohexene-1,4-bis(o-chlorobenzylaminomethyl)*

1-cyclohexene-1,4-bismethylamine (5.2 gm.) and o-chlorobenzaldehyde (12.8 gm.) were refluxed in benzene for 6 hours and the liberated water was removed by azeotropic distillation. The benzene was removed to yield the corresponding Schiff's base as a solid, M.P. 127-130° C. It was dissolved in methanol and refluxed with sodium borohydride (3.5 gm.) for 24 hours. The methanol was removed and the residue distributed between water and benzene. The benzene layer was dried and evaporated to yield the title compound as an oil. λ max. 265 mμ (ε—389). The dihydrochloride salt was prepared with ethereal hydrogen chloride. It was crystallized from a methanol-ether mixture and had M.P. 274° C. Analysis confirmed the empirical formula $C_{22}H_{28}N_2Cl_4$.

In a similar manner the o-trifluoromethyl derivative, 1-cyclohexene-1,4-bis-(o - trifluoromethylbenzylaminomethyl), is prepared.

EXAMPLE 5

*N,N'-di-(cyclohexylmethyl)-1-cyclohexene-1,4-dicarboxamide*

1-cyclohexene-1,4-dicarbonyl chloride (10.3 gm.) (prepared as described in Example 1) was added slowly, with vigorous stirring, to a mixture of cyclohexylmethylamine (11.0 gm.) (prepared by catalytic hydrogenation of benzylamine), sodium hydroxide (100 ml. of a 1 N solution) and benzene (150 ml.). Stirring was continued for 1 hour then the mixture filtered, the precipitate washed with acetone and crystallized from methanol to yield the title compound M.P. 228-232° C.

EXAMPLE 6

*N,N'-di-(cyclohexylethyl)-1-cyclohexene-1,4-dicarboxamide*

By following the process of Example 5, 1-cyclohexene-1,4-dicarbonyl chloride (10.3 gm.), cyclohexylethylamine (13.3 gm.) (prepared by catalytic hydrogenation of β-phenethylamine), sodium hydroxide (100 ml. of a 1 N solution) and benzene (150 ml.) were reacted together. Filtration yielded the title compound, M.P. 219-226° C. on crystallization from methanol. The empirical formula $C_{24}H_{40}N_2O_2$ was confirmed by analysis.

EXAMPLE 7

*N,N'-di-(d,l-1-indanyl)-1-cyclohexene-1,4-dicarboxamide*

By following the process of Example 5, 1-cyclohexene-1,4-dicarbonyl chloride (10.3 gm.), d,l-1-aminoindane (13.3 gm.), sodium hydroxide (100 ml. of a 1 N solution), and benzene (200 ml.) were reacted together to yield the title compound. It was crystallized from dimethylformamide and had M.P. 320-325°, λ max. 257 mμ (ε—517), 264 mμ (ε—606) and 271 mμ (ε—594).

The empirical formula $C_{26}H_{28}N_2O_2$ was confirmed by analysis.

EXAMPLE 8

*1,4-bis-(cyclohexylmethylaminomethyl)-1-cyclohexene*

The diamide of Example 5 (14.5 gm.) and lithium aluminum hydride (11.0 gm.) were refluxed in tetrahydrofuran (500 ml.) for 24 hours. Water (50 ml.) was added cautiously, the inorganic salts separated by filtration and the filtrate dried ($Na_2SO_4$) and evaporated in vacuo to yield the title compound as a yellow oil, λ max. 1640 cm.$^{-1}$ and 1500 cm.$^{-1}$.

The diacetate salt was prepared by adding an ethereal solution of acetic acid to an ethereal solution of the free base. On crystallization from a methanol-acetonitrile mixture, it had M.P. 192-195° C.

The empirical formula $C_{26}H_{48}N_2O_4$ was confirmed by analysis.

EXAMPLE 9

*1,4-bis-(cyclohexylethylaminomethyl)-1-cyclohexene*

By following the process of Example 8, the diamide of Example 6 (15 gm.) was reduced with lithium aluminum hydride (12 gm.) in tetrahydrofuran (500 ml.) to yield the title compound as an oil λ max. 1640 and 1500 cm.$^{-1}$. The diacetate salt was prepared in the usual manner and crystallized from a methanol-acetonitrile mixture. It had M.P. 173-177° C. and analysis confirmed the empirical formula $C_{28}H_{52}N_2O_4$.

EXAMPLE 10

*1,4-bis-(d,l-1-indanylaminomethyl)-1-cyclohexene*

The diamide of Example 7 (912.7 gm.) was reduced with lithium aluminum hydride (10 gm.) in tetrahydrofuran (600 ml.) by following the process of Example 8. The title compound was obtained as a solid and had M.P. 92-93° C. The dihydrochloride salt was prepared by conventional procedures. It was crystallized from methanol and did not melt when heated to 300° C. Analysis confirmed the empirical formula $C_{26}H_{34}N_2Cl_2$.

EXAMPLE 11

*N,N'-dicyclohexyl-1-cyclohexene-1,4-dicarboxamide*

1-cyclohexene-1,4-dicarbonyl chloride (10.3 gm.), cyclohexylamine (20.8 gm.) and benzene (150 ml.) were refluxed together for 1 hour. The solids in the reaction mixture were isolated by filtration and triturated with water. Crystallization from dimethylformamide yielded the title compound, M.P. 302–306° C., empirical formula $C_{20}H_{30}N_2O_2$ confirmed by analysis.

EXAMPLE 12

*1,4-bis-(cyclohexylaminomethyl)-1-cyclohexene*

The diamide of Example 11 (14.0 gm.), lithium aluminum hydride (10.0 gm.) and tetrahydrofuran (500 ml.) were refluxed together for 24 hours. The reaction was worked up as described in Example 8 to yield the title compound as a yellow oil. The diacetate salt was prepared by conventional procedures. It had M.P. 195–198° C. and analysis confirmed the empirical formula $C_{24}H_{44}N_2O_4$.

I claim:

1. 1,4-bis - (cyclohexylmethylaminomethyl) - 1 - cyclohexene.
2. The diacetate salt of 1,4-bis-(cyclohexylmethylaminomethyl)-1-cyclohexene.
3. 1,4-bis-(cyclohexylethylaminomethyl) - 1 - cyclohexene.
4. The diacetate salt of 1,4-bis-(cyclohexylethylaminomethyl)-1-cyclohexene.
5. 1,4-bis-(d,l-1-indanylaminomethyl)-1-cyclohexene.
6. The dihydrochloride salt of 1,4-bis-(d,l-1-indanylaminomethyl)-1-cyclohexene.
7. 1,4-bis-(cyclohexylaminomethyl)-1-cyclohexene.
8. The diacetate salt of 1,4-bis-(cyclohexylaminomethyl)-1-cyclohexene.

References Cited by the Examiner

UNITED STATES PATENTS

| | | | |
|---|---|---|---|
| 2,627,491 | 2/1953 | Szabo et al. | 260—563 X |
| 2,692,282 | 11/1954 | Brown | 260—563 X |
| 2,988,554 | 6/1961 | Batzer et al. | 260—563 X |
| 3,164,601 | 1/1965 | Thesing et al. | 260—563 X |

FOREIGN PATENTS 605,034  9/1960  Canada.

OTHER REFERENCES

Houben-Weyl, "Methoden Der Organischen Chemie," vol. 11/1, pp. 669–670 (1957).

Yale, "J. Med. Pharm. Chem.," vol. 1, pp. 121–133 (1959).

CHARLES B. PARKER, *Primary Examiner.*